July 15, 1952     R. W. JOHNSON     2,603,139
ROTARY TILLING APPARATUS
Filed Oct. 21, 1946     2 SHEETS—SHEET 1
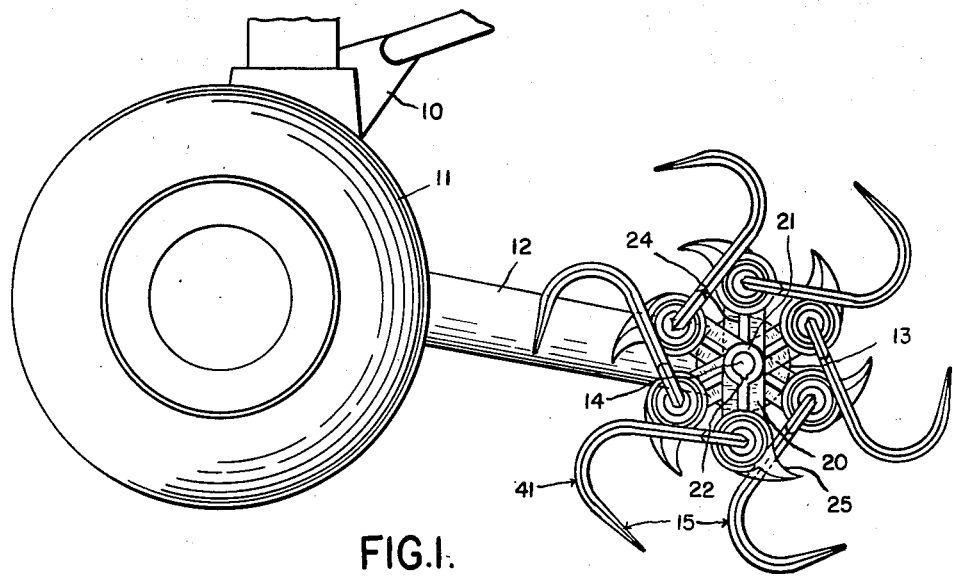
FIG.I.
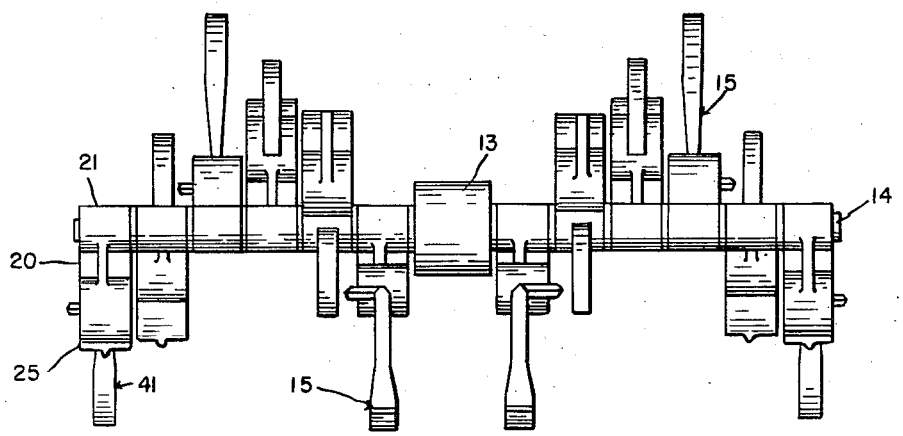
FIG.2.
INVENTOR.
ROY W. JOHNSON
BY
Whittemore, Hulbert
& Belknap    ATTORNEYS July 15, 1952  R. W. JOHNSON  2,603,139
ROTARY TILLING APPARATUS
Filed Oct. 21, 1946  2 SHEETS—SHEET 2

INVENTOR.
ROY W. JOHNSON
BY
Whittemore, Hulbert
& Belknap
ATTORNEYS

Patented July 15, 1952

2,603,139

UNITED STATES PATENT OFFICE 2,603,139

ROTARY TILLING APPARATUS

Roy W. Johnson, Detroit, Mich.

Application October 21, 1946, Serial No. 704,733

9 Claims. (Cl. 97—21.6)

The present invention relates to a rotary tilling apparatus of the type in which tilling tines are mounted for rotation about a drive shaft which extends perpendicular to the direction of movement of the implement.

Efforts have been made in the past to provide tilling tines of this general nature which are resiliently mounted so that they will give or bend when they encounter an obstacle and spring back to operating position when the obstacle is past. In accordance with the present invention, the tilling tines are mounted adjacent the ends of rigid arms carried by the rotary drive shaft and the mounting means for the tines permits a substantial relative rotation between the tines and the arms. The tines are arranged to extend angularly with respect to the arm so that limited rocking movement of the tine relative to the arm provides substantial clearing movement between the tine and an obstacle which it may encounter. The specific means employed for mounting the tine adjacent the end of the arm carried by the drive shaft takes the form of a body of resilient material such for example as rubber which is arranged to resist turning movement of the tine relative to the arm solely by torsion of the resilient body. This is to be contrasted with a type of mounting in which turning movement of the tine might be opposed by compression of rubber.

With the foregoing general remarks in mind, it is an object of the present invention to provide an improved rotary tilling implement characterized by the provision of means for effecting a novel and improved relieving movement of the tines relative to their support.

It is a further object of the present invention to provide a rotary tilling implement having tines supported remote from the axis of rotation thereof for a substantial relieving movement which is opposed throughout solely by torsion of a body of resilient material.

It is a feature of the present invention to provide in a rotary tilling implement having a rotary drive shaft, a tilling tool comprising an arm extending radially from the drive shaft and having a tilling tine mounted in a resilient annular body of rubber adjacent the outer end of the arm.

Other objects and features of the invention will become apparent as the description proceeds, especially when considered in conjunction with the accompanying drawings, wherein:

Figure 1 is a fragmentary side elevation of a rotary tilling implement constructed in accordance with the present invention;

Figure 2 is a rear elevation of the tilling tools carried by the implement;

Figure 3:
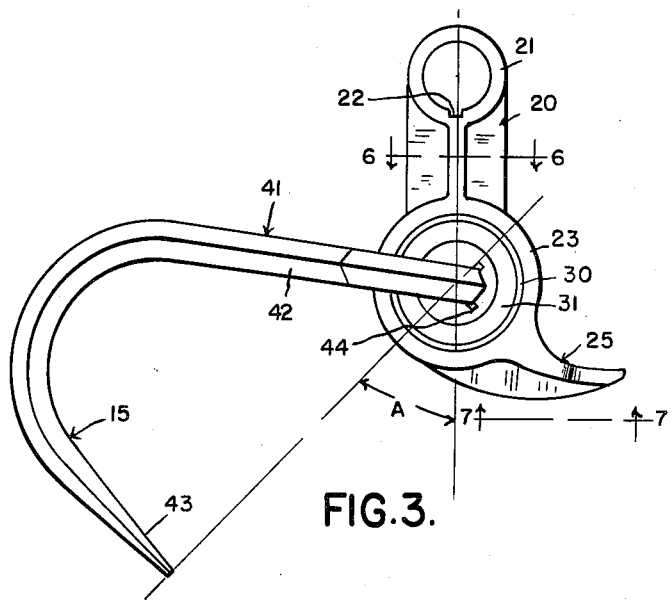
Figure 3 is a side elevation of a tilling tool constructed in accordance with the present invention.

The tilling implement which forms the subject matter of the present invention comprises power means indicated generally at 10 mounted on ground wheels 11 and including a supporting and power transmission tube 12 which carries a transmission housing 13 at its rear end. Extending laterally from both sides of the transmission housing 13 is a drive shaft 14 which carries a plurality of tilling tools 15.

Figure 6:
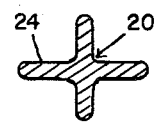
Figure 6 is a section on the line 6—6 of Figure 3.
Figure 7:
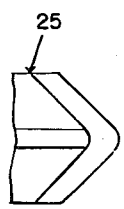
Figure 7 is a fragmentary bottom plan view taken along the line 7—7 of Figure 3.

Each of the tilling tools 15, as best seen in Figures 3 to 7, comprises an arm 20 having a cylindrical sleeve 21 provided with a keyway 22 adapted to be mounted on and keyed to the drive shaft 14 for positive rotation therewith. At the opposite end of the arm 20 from the sleeve 21 is an enlarged tine supporting sleeve 23. Preferably the arm intermediate the sleeves 21 and 23 is formed of crossing webs 24, as best seen in Figure 6. The sleeve 23 is provided with a tilling projection 25 which, as best seen in Figure 3, extends beyond the sleeve 23 and is curved forwardly therefrom in the direction of rotation. The projection 25 is adapted to enter the ground and to effect tilling thereof when the device as a whole is employed in relatively deep tilling. When the tilling operation performed by this apparatus as a whole is relatively shallow, the tilling projection 25 will of course not enter the ground.

Figure 4:
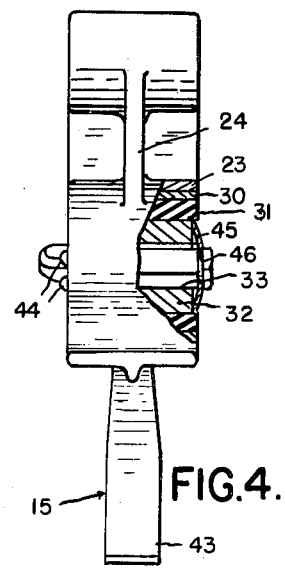
Figure 4 is a front elevation of the tilling tool illustrated in Figure 3.
Figure 5:
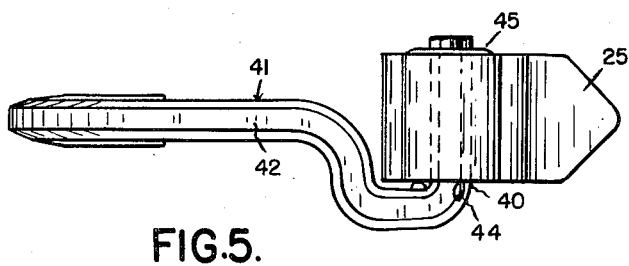
Figure 5 is a top plan view of the tilling tool illustrated in Figure 3.

As best seen in Figure 4, the sleeve 23 has received therein a metal sleeve 30 within which is located an annular resilient body 31 which may be formed of rubber. The body 31 will be referred to as a rubber body hereinafter, but it is to be understood that the body may be formed of natural or synthetic rubber or other material having the appropriate resilient properties. Preferably the rubber body 31 is cylindrical although it will be appreciated that if desired its shape may be somewhat modified, as for example to a polygonal cross section. Secured within the annular rubber body 31 is an inner bushing 32 provided with a serrated opening 33 therethrough for the reception of the supported end 40 of the tine 41. The rubber body 31 is held between the sleeve 30 and the inner bushing 32 so that relative rotational movement between the sleeve 30 and the inner bushing 32 will be opposed by torsion of the rubber body. This permits substantial relative movement between the parts, which movement will at no time be resisted by compression of rubber. This is of considerable importance, since it will be appreciated that movement opposed by compression of rubber between rigid surfaces would be strictly limited by the initial spacing of the surfaces, whereas in the present case the factor which limits relative rotation between the parts is only the torsional resistance to rotation of the annular rubber body 31 which may be controlled by variation in design and compounding of the body.

Relative movement between the inner and outer surfaces of the rubber body 31 and the adjacent surfaces of the bushing 32 and sleeve 30 is prevented. This may be by bonding of rubber to metal as by controlled brass plating, cement and heat, or other means of effecting a permanent attachment between the surfaces. Any method of preventing relative slippage may be employed. As a result of this construction the torque is transmitted through the rubber without any slippage of the rubber against the surfaces of the sleeve or bushing and the tine is therefore at all times driven solely through the torque in the rubber bushing.

Received within the inner bushing 32 is the supported end 40 of the tine 41. The tine 41 is formed of spring steel stock and it is bent to the conformation best seen in Figure 5, with the result that the reversely bent supported end 40 occupies the plane of rotation of the shank 42 thereof.

The outer end of the tine 41 is curved and flattened as indicated at 43 to effect an efficient tilling operation of the soil.

In order to retain the tine 41 in the bushing 32, abutment tabs 44 are provided, and at the free end of the supported end portion 40 is a dished spring washer or retainer 45. The washer 45 is provided with a hexagonal opening of a size to permit it to be slipped over the end of the tine 41 into registry with a groove 46 formed adjacent the end of the tine. The spring washer may thereafter be turned out of registry with the hexagonal portion of the tine beyond the groove 46 and retained in position by engagement with detents formed at the end of the bushing 32.

The sleeve 30 is constructed so as to have a tight press fit in the sleeve 23 and the assembly comprising the sleeve 30, the rubber body 31 and the inner bushing 32 is inserted as a unit therein. The tines 41 are readily replaceable in the inner bushing 32 simply by removal of the spring washer 45.

Inasmuch as the shank 42 of the tine 41 extends angularly with respect to the arm 20, it will be appreciated that relatively slight rotation between the tine 41 and the arm 20 will effect a substantial clearing movement between the end 43 of the tine and an obstacle which it has encountered.

The amount of force opposing rotation of the tine 41 will be dependent of course upon the dimensions and characteristics of the annular rubber body 31 and this can be selected in accordance with the conditions to be encountered. It is found, however, that the use of an annular rubber body in the relationship disclosed serves as a very efficient means of providing for a resilient relieving motion of the tines upon encountering an obstacle and completely avoids the breakage of coil springs, which has a disadvantage in previous constructions.

Referring to Figure 3 of the drawing, a line has been drawn joining the axis about which the tine 41 pivots and the end 43 of the tine. The angle which this line makes with the axis of the arm 20 is designated A and is herein termed the knee angle. Due to the provision of serrations at the inner surface of the bushing 32, it will be appreciated that the knee angle A may be adjusted as desired. It will further be apparent that variation in the knee angle has a considerable effect upon both the tilling action and also upon the amount of rotation required between the tine 41 and the arm 20 in order to effect clearing of an obstacle in the ground. By the provision of the adjustable feature of mounting the tine which follows the provision of a serrated surface at the interior of the bushing 32, the angle A may be set at any predetermined amount to obtain the desired results. It may be stated in general that the angle A for best results should be between 20° and 60° and very satisfactory results have been obtained when the angle is in the neighborhood of 40°.

Attention is further directed to the fact that the present construction provides for resilient relief of the tilling tine in a construction which is characterized by its simplicity, its compactness, and the lack of any tendency therein to accumulate weeds or other trash during operation.

While there is illustrated and described a single preferred embodiment of my improved rotary tilling tool, it will be understood that this specific illustration and description has been given merely to enable those skilled in the art to practice the invention, the scope of which is indicated by the appended claims.

What I claim is:

1. In a tilling implement having a power driven shaft, an arm extending radially from said shaft and provided with an opening therethrough parallel to the axis of said shaft, an annular rubber body fixed in said opening, a tine having a shank and a supported end portion perpendicular to the shank, and a reversely bent portion intermediate said shank and supported end portion locating said shank in a plane perpendicular to and intermediate the ends of said supported end portion, said end portion being received within said body and fixedly secured thereto, said body providing for limited displacement of said tine upon excessive resistance.

2. A tilling tool comprising a tine support having parallel sleeves at opposite ends, one of said sleeves being constructed and arranged for rigid connection to a driving shaft, a tine supporting assembly rigidly mounted in said other sleeve, said assembly comprising an outer metallic sleeve, an intermediate annular rubber body and an inner bushing, said bushing having a non-circular opening therethrough parallel to the axes of said sleeves, a tilling tine having a supported end of a cross section corresponding to the opening in said inner bushing and bent at right angles to the plane of rotation of said tine, the supported end of said tine projecting through the opening in said inner bushing, and a retainer releasably secured to the projecting end of said supported end and engaging one end of the inner bushing.

3. A tilling tool comprising a tine support having parallel sleeves at opposite ends, one of said sleeves being constructed and arranged for rigid connection to a driving shaft, a tine supporting assembly rigidly mounted in said other sleeve, said assembly comprising an outer metallic sleeve, an intermediate annular rubber body and an inner bushing, said bushing having a non-circular opening therethrough parallel to the axes of said sleeves, a tilling tine having a supported end of a cross section corresponding to the opening in said inner bushing and bent at right angles to the plane of rotation of said tine, the supported end of said tine projecting through the opening in said inner bushing, and a spring washer carried at the end of said supported end and engaging one end of the inner bushing, the end of said tine having an annular groove adjacent its end, said spring washer having a non-circular opening adapted to slip over the end of said tine into registry with said groove, said spring washer being thereafter rotatable in said groove to effect locking engagement between said spring washer and said tine, and locking means for preventing accidental rotation of said spring washer on said tine into releasing position.

4. A tilling tool comprising a rigid arm for connection to a rotary drive shaft, a tilling tine adapted to be mounted adjacent the outer end of said arm, said tine having a shank and a supported portion extending substantially normal to said shank and resilient and adjustable mounting means for said tine, said means comprising a resilient annular body including tubular means therein to receive said supported portion with said tine in different positions of angular adjustment relative to said arm.

5. A tilling tool comprising a rigid arm, means on one end of said arm for mounting said arm radially of a rotary drive shaft, a tilling tine having a shank and a supported end portion generally perpendicular to said shank, said arm having an opening in its end remote from the shaft, said opening being parallel to the axis of the drive shaft, a hollow generally cylindrical rubber body fixedly secured in said opening with its axis parallel to the axis of the shaft, the supported end portion of said tine being fixedly secured in said body.

6. A tilling tool comprising a rigid arm, means on one end of said arm for mounting said arm radially of a rotary drive shaft, a tilling tine having a shank and a supported end portion generally perpendicular to said shank, said arm having an opening in its end remote from the shaft, a resilient tine mounting device comprising inner and outer metal sleeves and a generally annular rubber body interposed between said sleeves and having its inner and outer surfaces fixedly secured to said sleeves, said device being fixedly secured in said opening, and means for rigidly mounting the supported end portion of said tine in different positions of angular adjustment in said inner sleeve.

7. A tilling tool comprising a rigid arm, means on one end of said arm for mounting said arm radially of a rotary drive shaft, a tilling tine having a shank and a supported end portion generally perpendicular to said shank, said arm having an opening in its end remote from the shaft, a hollow generally cylindrical rubber body fixedly secured in said opening with its axis parallel to the axis of the shaft, a metal sleeve fixedly secured within said body, said sleeve having an inner serrated surface, the supported end of said tine being of polygonal cross-section insertable in said sleeve to interfit with serrations therein in different positions of angular adjustment.

8. A tilling tool comprising a rigid arm, means on one end of said arm for mounting said arm radially of a rotary drive shaft, a tilling tine having a shank and a supported end portion generally perpendicular to said shank, said arm having an opening in its end remote from the shaft generally parallel to the axis of said shaft, a resilient tine mounting device comprising inner and outer metal sleeves and a generally annular rubber body interposed between said sleeves and having its inner and outer surfaces fixedly secured to said sleeves, said device being fixedly secured in said opening, and means for rigidly mounting the supported end portion of said tine in said inner sleeve.

9. A tilling tool comprising a rigid arm, means on one end of said arm for mounting said arm radially of a rotary drive shaft, a tilling tine having a shank and a supported end portion generally perpendicular to said shank, said arm having an opening in its end remote from the shaft generally parallel to the axis of said shaft, a resilient tine mounting device comprising inner and outer metal sleeves and a generally annular rubber body interposed between said sleeves and having its inner and outer surfaces fixedly secured to said sleeves, said device being fixedly secured in said opening, said inner sleeve having a serrated inner surface, the supported end portion of said tine being of polygonal cross-section and adapted to be retained by the serrated inner surface of said inner sleeve in different positions of angular adjustment, and means engaging the free end of the supported end portion of said tine effective to retain said portion in said sleeve.

ROY W. JOHNSON.

REFERENCES CITED

The following references are of record in the file of this patent:

UNITED STATES PATENTS

| Number | Name | Date |
|---|---|---|
| 941,422 | Koszegi et al. | Nov. 30, 1909 |
| 1,693,981 | Geyer | Dec. 4, 1928 |
| 1,862,304 | Grams | June 7, 1932 |
| 2,054,129 | Kelsey | Sept. 15, 1936 |
| 2,246,848 | Hicks | June 24, 1941 |